L. FLUM.
SPRING WHEEL.
APPLICATION FILED JUNE 26, 1908.
931,048.
Patented Aug. 17, 1909.
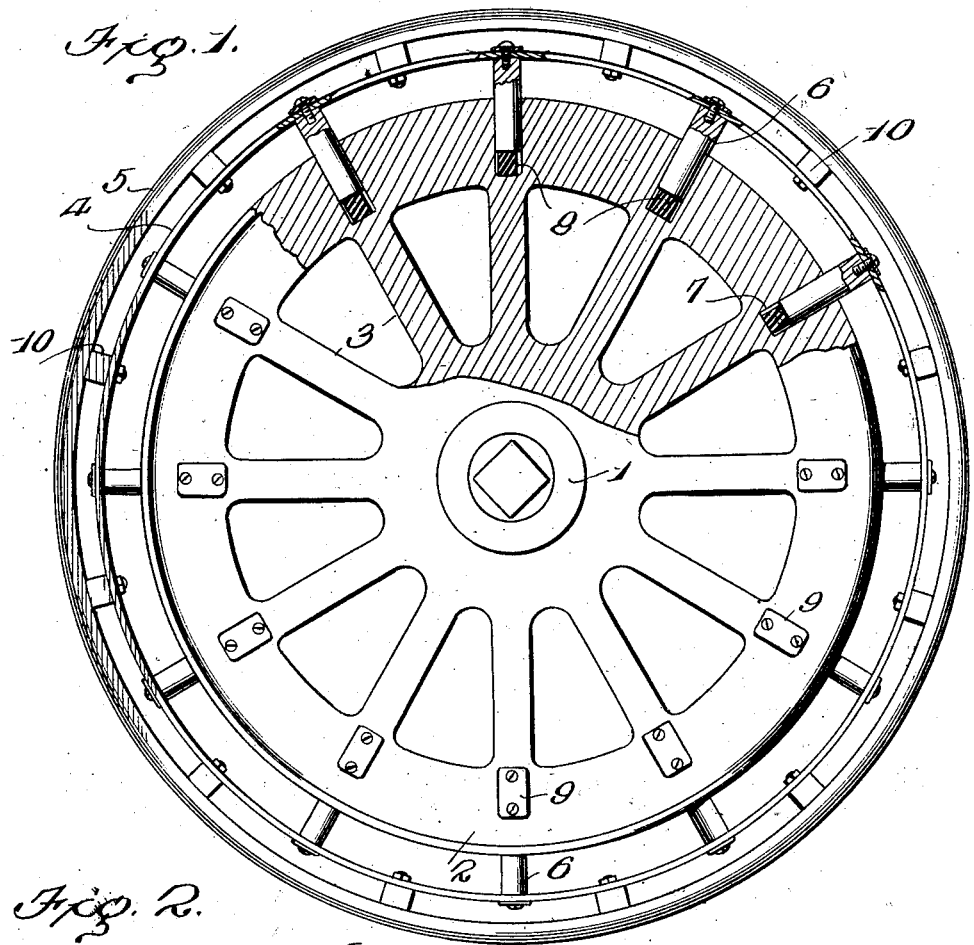
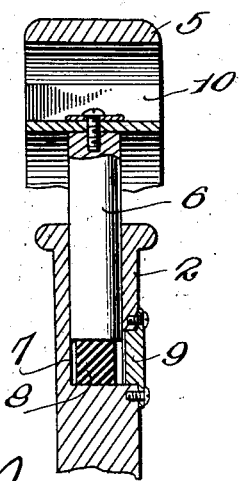
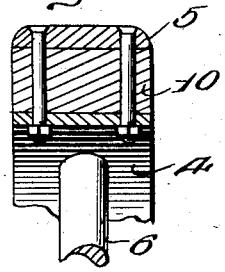
Witnesses
Inventor
Ludwig Flum
By
Attorney

UNITED STATES PATENT OFFICE.

LUDWIG FLUM, OF CHICAGO, ILLINOIS.

SPRING-WHEEL.

No. 931,048.　　　Specification of Letters Patent.　　　Patented Aug. 17, 1909.

Application filed June 26, 1908. Serial No. 440,527.

*To all whom it may concern:*

Be it known that I, LUDWIG FLUM, citizen of the United States, residing at Chicago, in the county of Cook and State of Illinois, have invented certain new and useful Improvements in Spring-Wheels, of which the following is a specification.

The present invention relates to certain new and useful improvements in spring wheels and has for its object to provide a wheel of this character which is simple and inexpensive in its construction and is formed with a resilient tread which will operate in an effective manner to absorb sudden shocks and jars and prevent their transmission to the body portion of the vehicle.

The invention further contemplates a spring wheel which may be easily and quickly repaired and which embodies few and durable parts which may be quickly assembled or taken apart as desired.

For a full understanding of the invention and the merits thereof and also to acquire a knowledge of the details of construction and the means for effecting the result, reference is to be had to the following description and accompanying drawings, in which:

Figure 1 is a side elevation of a spring wheel constructed in accordance with the invention, portions being broken away and shown in section. Fig. 2 is an enlarged sectional view through a portion of the rim of the wheel. Fig. 3 is an enlarged transverse sectional view through a portion of the spaced bands surrounding the rim of the wheel, showing one of the blocks interposed between the spaced bands.

Corresponding and like parts are referred to in the following description and indicated in all the views of the drawings by the same reference characters.

Specifically describing the present embodiment of the invention the numeral 1 designates a hub and 2 a rim which is connected to the hub by means of the spokes 3. Surrounding the rim 2 and spaced therefrom are the spaced bands 4 and 5 which are formed of some spring material such as steel. The inner band 4 carries a number of inwardly projecting plungers 6 which are loosely received within openings 7 formed in the rim 2 of the wheel. In the present instance these openings 7 are shown as arranged in alinement with the spokes 3 and have a diameter somewhat greater than that of the plungers 6 to admit of a free movement of the latter members. The inner ends of the plunger 6 bear against plugs 8 which are arranged within the openings 7 and are formed of some resilient material such as rubber. It will thus be obvious that these plugs will form cushions and will tend to prevent the transmission of any sudden shocks and jars from the band 4 to the body portion of the wheel.

As shown on the drawings the inner ends of the openings 7 communicate with lateral openings which are normally closed by the plates 9, the plugs 8 being removable through the lateral openings to enable them to be replaced without the necessity of removing either of the resilient bands 4 or 5. The two bands 4 and 5 are themselves connected by blocks 10 which are arranged between the plungers 6, the blocks being held in position by any suitable means such as the bolts shown on the drawing. With this construction it will be obvious that as the wheel revolves the bands 4 and 5 will form a yielding tread and accommodate themselves to slight inequalities in the surface in the road and will operate in conjunction with the resilient plugs 8 to absorb all sudden jars and prevent their transmission to the vehicle.

Having thus described the invention, what is claimed as new is:

In a device of the character described, the combination of a wheel formed at its periphery with a plurality of radially disposed openings communicating at their inner ends with lateral openings leading to the side of the wheel, removable closures for the lateral openings, resilient plugs fitted within the radial openings and removable through the lateral openings, a pair of spaced spring bands surrounding the wheel and spaced therefrom and also from each other, uniformly spaced blocks connecting the spaced bands, and plungers projecting radially from the inner band, the said plungers being secured to the inner band between the before mentioned blocks and being received loosely within the radial openings of the periphery of the wheel so as to bear against the resilient plugs within the said radial openings.

In testimony whereof I affix my signature in presence of two witnesses.

LUDWIG FLUM. [L. S.]

Witnesses:
　H. E. MEANS,
　P. C. GILL.